United States Patent [19]

Morrow et al.

[11] 4,455,239

[45] Jun. 19, 1984

[54] CLARIFICATION OF FLUIDS

[75] Inventors: Jerry D. Morrow, Leawood, Kans.; Paul L. Andrews, Kansas City, Mo.

[73] Assignee: Burns & McDonnell Engineering Company, Inc., Kansas City, Mo.

[21] Appl. No.: 535,558

[22] Filed: Sep. 27, 1983

[51] Int. Cl.³ ............................................. B01D 21/02
[52] U.S. Cl. .................... 210/802; 210/806; 210/220; 210/256; 210/258; 210/521; 210/532.1
[58] Field of Search ............... 210/801, 802, 803, 804, 210/220, 256, 258, 416.1, 521, 532, 537, 538, 194, 195.1

[56] References Cited

U.S. PATENT DOCUMENTS

| 3,385,444 | 6/1966 | Dufournet | 210/220 |
| 4,259,185 | 3/1981 | Mixon | 210/256 |
| 4,303,516 | 12/1981 | Stensel et al. | 210/220 |
| 4,409,106 | 10/1983 | Furuta | 210/802 |

OTHER PUBLICATIONS

Christopher et al., "New Waste Water Process Cuts Plant Costs 60%", *Civil Engineering -ASCE*, May 1983, pp. 39-41.

*Primary Examiner*—Ernest G. Therkorn

*Attorney, Agent, or Firm*—Roylance, Abrams, Berdo & Goodman

[57] ABSTRACT

There is provided an apparatus for clarifying fluid in a fluid container, e.g., a tank, basin or lagoon. The apparatus comprises a first means for defining a quiescent zone in the container. The first means includes a pair of end walls, a pair of side walls, and a bottom wall comprising at least one surface having open and closed areas to permit settled solids to pass out of the quiescent zone. Means are provided to introduce fluid containing suspended solids into the quiescent zone. Preferably, the bottom wall also permits fluid containing suspended solids to pass into the quiescent zone. For instance, the bottom wall may comprise spaced, sloping surfaces extending across the bottom. A second means is located below the first means and defines a fluid flow path below and in communication with the bottom wall of the quiescent zone. The second means has both an inlet and an outlet. A pump means is provided which is located substantially adjacent to the outlet of the second means and which creates a low pressure area at this outlet. This low pressure area causes the fluid to flow into the inlet of the second means, along the flow path. Settled solids pass through the open areas in the bottom wall from the quiescent zone into the flow path. A third means is provided in the first means for removing clarified fluid from the top of the first means and from the fluid container.

25 Claims, 7 Drawing Figures

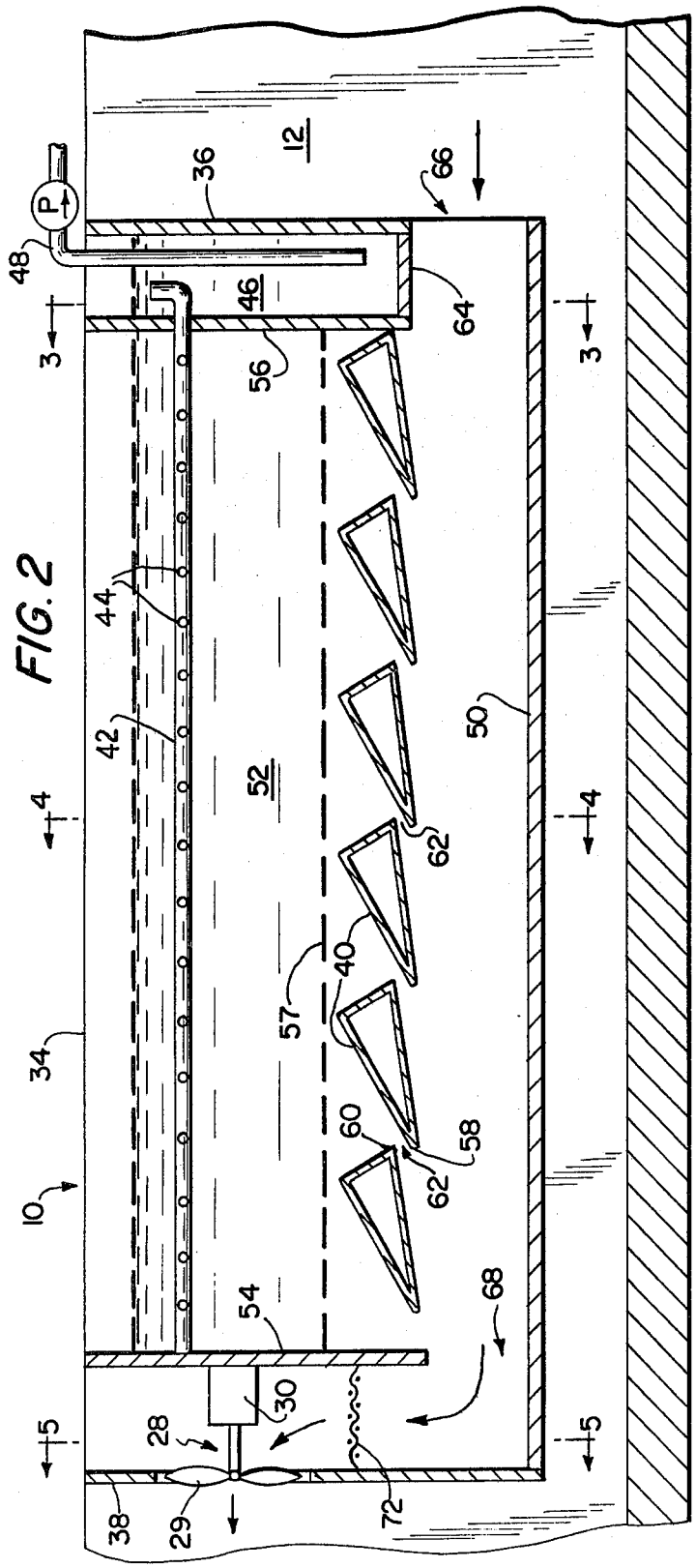
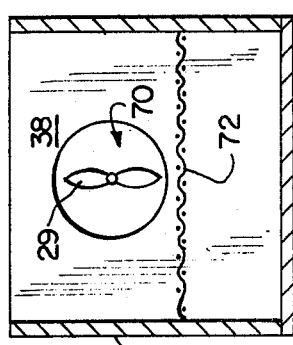
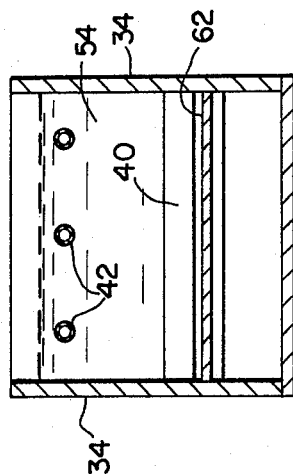
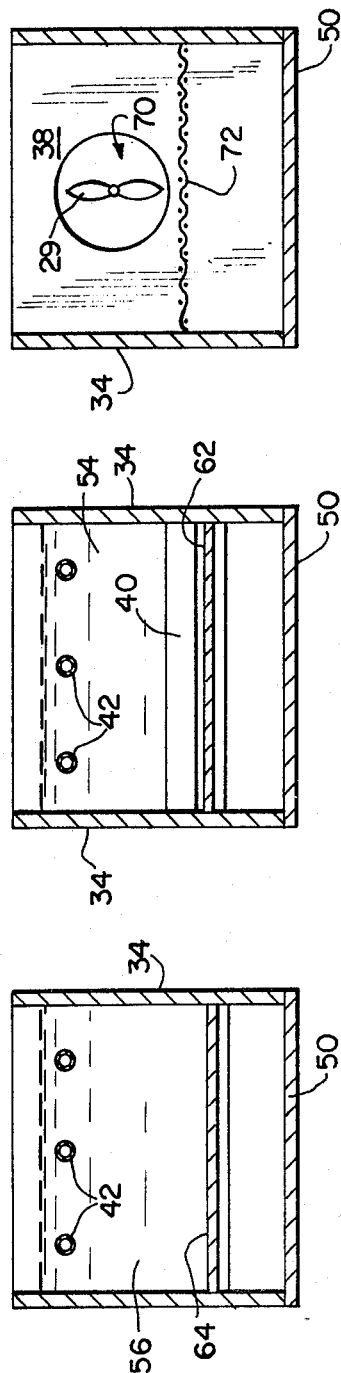
FIG. 2
FIG. 3
FIG. 4
FIG. 5

CLARIFICATION OF FLUIDS

BACKGROUND OF THE INVENTION

This invention relates to the clarification of fluids containing suspended settleable solids.

Domestic sewage and other forms of waste water often contain impurities in the form of suspended solids. Examples of waste water other than sewage include drainage water containing clay or silt, clean-up and process water from food processing industries, water containing precipitated particles of heavy metals from the electroplating industry, pickle liquor from steel plant operations, waste water from the metal finishing industry, waste water from painting operations, etc. It is desirable to remove the suspended solids prior to returning the waste water to the environment. Water supplies frequently contain silt, clay, and objectionable dissolved solids which can be chemically treated to precipitate the unwanted materials. It is necessary in most instances to remove these suspensions of silt and precipitates in order to obtain water suitable for domestic and other uses. Additionally, certain liquid products containing suspended solids must be clarified to enhance their value. Conventionally, this is accomplished by passing the fluid to a clarifier where the suspended solids are permitted to settle, forming a sludge which is disposed of by suitable means. Clarified effluent is withdrawn from the top of the clarifier for use or return to the environment. Settled waste solids are suitably disposed of, e.g., in land fill.

Christopher et al in an article entitled "New Waste Water Process Cuts Plant Costs 60%", *Civil Engineering—ASCE*, May 1983, pages 39-41 describes an intra-channel clarifier for use in a circulating acvitated sludge sewage treatment system. According to the clarifier system described in this article, raw sewage enters the aeration basin, is aerated, then passed beneath an intra-channel clarifier wherein a portion of mixed liquor, i.e., a mixture of waste water and activated sludge, rises into the clarifier through openings in the clarifier bottom panels. As the mixed liquor flows up into the quiescent clarifier zone, solids are separated, fall down through the openings and return to the continuously flowing mixture below. Clarified effluent is removed from the quiescent zone in the upper portion of the clarifier through orifice pipes submerged about one foot beneath the water's surface. The aeration basin in which the clarifier is used is an oxidation ditch which includes a closed flow path, i.e., one or more pumps are provided for circulating the liquid through the flow path beneath the clarifier. The liquid enters beneath the clarifier at a higher pressure than the liquid exiting beneath the clarifier and at the other end of the flow path because of head loss experienced during the flow of the liquid under the clarifier.

SUMMARY OF THE INVENTION

It has now been discovered that the treatment system described by Christopher et al., supra, may be modified so as to substantially reduce system costs, improve the hydraulics and render it suitable for use in a non-circulating treatment system.

In accordance with this invention, there is provided an apparatus for clarifying fluids in a fluid container, e.g., a tank, basin or lagoon. The apparatus comprises a first means for defining a quiescent zone in the container. The first means includes a pair of end walls, a pair of side walls, and a bottom wall comprising at least one surface having open and closed areas to permit settled solids to pass out of the quiescent zone. Means are provided to introduce fluid containing suspended solids into the quiescent zone. Preferably, the bottom wall also permits fluid containing suspended solids to pass into the quiescent zone. For instance, the bottom wall may comprise spaced, sloping surfaces extending across the bottom. A second means is located below the first means and defines a fluid flow path below and in communication with the bottom wall of the quiescent zone. The second means has both an inlet and an outlet. A pump means is provided which is located substantially adjacent to the outlet of the second means and which creates a low pressure area at this outlet. This low pressure area causes the fluid to flow into the inlet of the second means, along the flow path. Preferably, a portion of the fluid passes into the quiescent zone through the open areas in the bottom wall and a portion of the fluid passes out the outlet. Settled solids pass through the open areas in the bottom wall from the quiescent zone into the flow path. A third means is provided in the first means for removing clarified fluid from the top of the first means and from the fluid container.

Preferably, the second means which defines the fluid flow path is bounded on the top by the bottom wall of the first means, closed on the bottom and sides thereof and open at each end. In one preferred embodiment, the pump means is situated in the opening at the outlet end of the second means. In another preferred embodiment, the pump means is situated above the opening in the outlet end of the second means adjacent the end wall of the first means. In an especially preferred embodiment of this invention, the bottom wall of the first means comprises a plurality of spaced, horizontal members extending substantially perpendicular to the flow path, the cross section of each member comprising a triangle, with the apex of the triangle facing the quiescent zone so as to provide no horizontal surfaces on the bottom facing the quiescent zone.

The use of the clarifier apparatus of this invention results in improved hydraulics over the system described by Christopher et al., supra, i.e., the solid particles entering the quiescent zone will not rise as high in the quiescent zone resulting in a more efficient formation of a clarified supernatant. The improved hydraulics are inherent in the fact that the volume of fluid which is taken through the flow path is independent of the volume of the fluid container. Further, the solid particles tend to be pulled into the flow path by a venturi effect which tends to prevent blockage of the open areas in the bottom wall of the quiescent zone. Placing the pump means at the exit of the flow path results in an enhanced venturi effect over that which would be obtained by placing the pump means at the entrance to the flow path. Additionally, the clarifier apparatus of this invention can be utilized in a static or non-flowing, non-circulating fluid treatment system. This permits installation in circular or other economically configured systems.

BRIEF DESCRIPTION OF THE DRAWINGS

Referring now to the drawings which are a part of this original disclosure:

FIG. 2 is an enlarged, side elevational view in section of the apparatus taken along line 2—2 in FIG. 1 and showing the impeller pump located above the apparatus bottom wall;

FIG. 3 is a reduced, end elevational view in section of the inlet of the apparatus taken along line 3—3 in FIG. 2;

FIG. 4 is a reduced, end elevational view in section of the baffles in the apparatus taken along line 4—4 in FIG. 2;

FIG. 5 is a reduced, end elevational view in section of the outlet of the apparatus taken along line 5—5 in FIG. 2;

DETAILED DESCRIPTION OF THIS INVENTION

Figure 1:
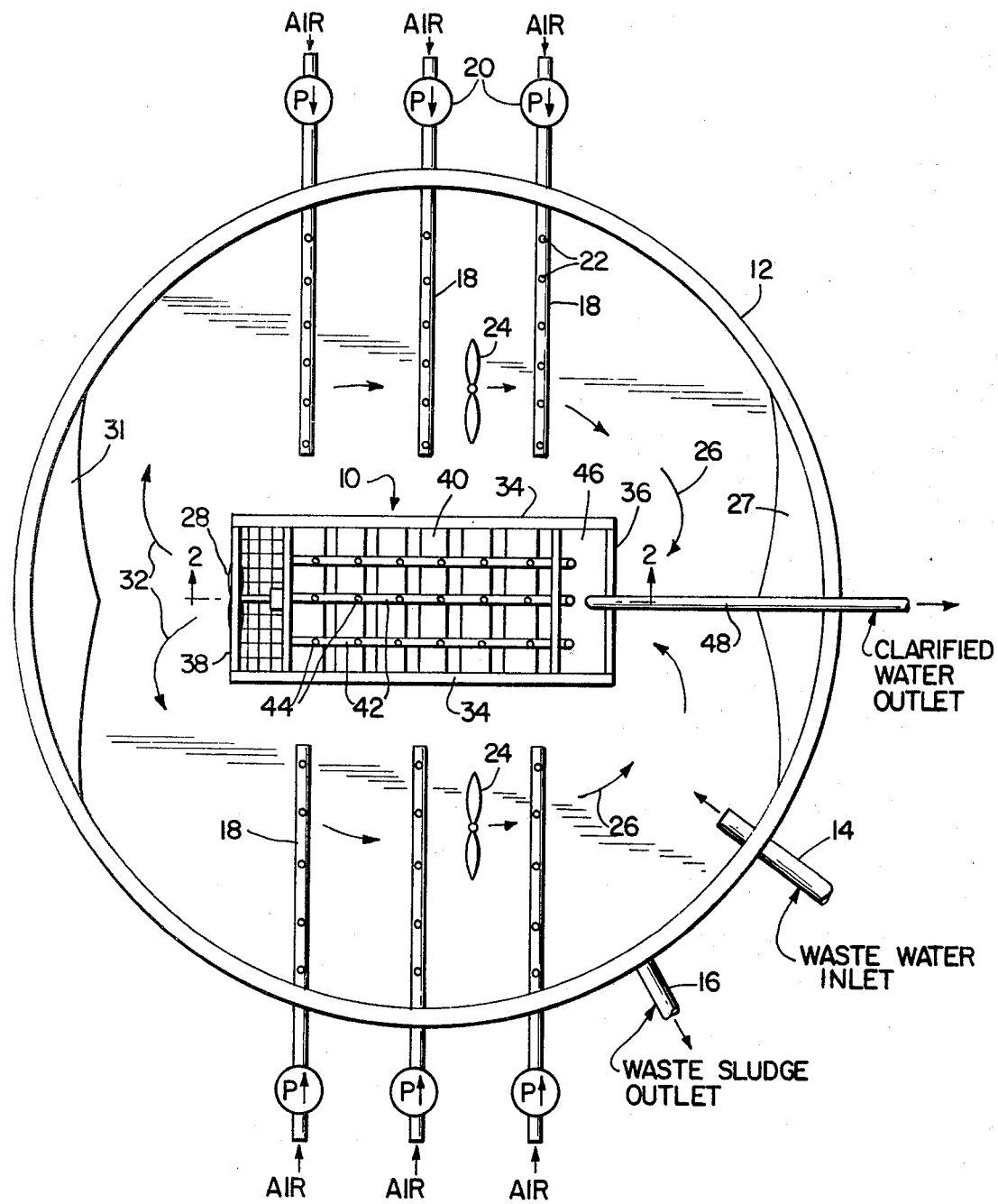
FIG. 1 is a top plan diagramatic view of the apparatus in accordance with this invention located in a circular tank with a pair of fluid flow deflectors located at opposite sides thereof, with a series of air diffuser pipes located on opposite sides of the apparatus, and with a pair of circulation pumps located on opposite sides of the apparatus.

This invention will now be described with reference to the accompanying drawings. The fluid clarified in the following description is sewage, although other fluids may be similarly treated such as those previously described.

Referring to FIGS. 1-5, a waste water clarifier system 10 is located in a waste water tank 12 which may be a tank, basin or lagoon. As depicted, the waste water container 12 is circular in shape although it may be other shapes, e.g., it may be oval in shape. Although the clarifier system 10 is shown located in the center of the container 12, it may be located in other positions, e.g., close to one side of the container. Sewage, which may have first been treated in a primary settling tank to remove waste primary sludge is passed to the container 12 through waste water inlet 14. Similarly, means in the form of an outlet conduit 16 is provided for removing waste sludge from the container by wasting a stream of mixed liquor. Air diffuser pipes 18 are provided for aerating the mixed liquor in the container 12 to reduce the BOD content thereof. Air is supplied by means of pumps 20 and is blown through the diffusers 22 in the pipes 18 into the mixed liquor. It will be understood that aeration is not necessary in the treatment of fluid systems which do not contain bio-degradable materials.

If desired, circulation pumps 24 may be provided to move the mmixed liquor in the directions indicated by the directional arrows 26. The circulation pumps 24 are not necessary and sometimes it is desirable to eliminate them from the system. It is preferred that the flow imparted by circulation pumps 24 to the mixed liquor be such that the flow from one pump negates the flow from the other pump prior to entry into the waste water clarifier system 10. In other words, it is preferred that there be zero velocity of the mixed liquor as it enters the flow path. Deflector 27 may be provided to help accomplish this result.

A pump 28 is located at the downstream end of the clarifier system 10. The pump 28 includes an impeller pump blade 29 and a motor 30. The pump 28 creates a low pressure area at the outlet of the clarifier system 10 causing waste water to flow into the flow path entrance 66. A deflector 31 aplits the flow coming out of the clarifier system as indicated by directional arrows 32.

The clarifier system 10 includes side walls 34, an inlet end wall 36, an outlet end wall 38 and baffle surfaces 40. Collection pipes 42 are provided to drain off the clarified supernatant. The clarified supernatant enters the pipes 42 through holes 44 and enters the clear water basin 46 from whence it is pumped out of the system through clarified water outlet 48.

Referring more specifically to FIGS. 2, 3, 4 and 5, the clarifier system 10 is shown in greater detail. The clarifier system comprises side wall 34, inlet end wall 36, outlet end wall 38 and bottom 50. A quiescent zone 52 is provided which is bounded on one end by baffle wall 54, on the other end by clear water basin wall 56 and on the bottom by baffle surfaces 40. In the quiescent zone 52, suspended solids settle from the waste water, thereby creating a stratum of clarified supernatant water which is shown in FIG. 2 above the boundary 57. The clarified supernatant is passed out of the system as previously described.

The baffle surfaces 40 include a series of surfaces of sufficient slope to allow a terminating end 58 of one surface to be below the beginning end 60 of another surface. There is an open area 62 between the terminating end 58 and the beginning end 60. This relationship forms the constricted opening necessary for hydraulics to be established. The baffle surfaces could be formed of flat plates, inverted V-shaped plates, L-shaped plates, triangular-shaped prisms, or hemispherical curved surfaces. In the embodiments shown in FIGS. 2 and 7, the baffle surfaces are triangular in cross-section, with the apex of the triangle facing the quiescent zone so as to provide no horizontal surfaces facing the quiescent zone.

A flow path is provided underneath the baffle surfaces 40 and under the bottom 64 of the clear water basin 46. The flow path is bounded on the bottom by the bottom 50 of the clarifier system and on the sides by side walls 34. It includes an entrance 66 which comprises an opening in inlet wall 36 and an exit 68 which comprises an opening between baffle wall 54 and the bottom 50 of the clarifier system.

The pump 28 is preferably a low speed large impeller pump. The pump 28 is installed in an outlet opening 70 in outlet wall 38 between outlet wall 38 and baffle 54. The wall 38 acts as a cowl for the pump 28 to increase the draft. In operation, the pump forces water out of the outlet 70 creating a suction or a low pressure area above the perforated plate 72. This causes waste water to be drawn from the waste water container 12 through the entrance 66 to the flow path, along the flow path underneath the bottom 64 of the clear water basin and the baffle surfaces 40, out the exit 68 to the flow path, up through the perforated plate 72 and out the outlet 70. The presence of the perforated plate 72 generates a small head loss and insures equal distribution of underflow. A portion of the waste water underneath the baffle surfaces 40 passes into the quiescent zone through the open areas 62 and settled solids pass through the open areas 62 from the quiescent zone into the flow path. The minimum pump speed required is that resulting in a liquid velocity of the waste water in the flow path so as to prevent substantial settling of solids from the quiescent zone onto the baffle surfaces 40.

Figure 6:
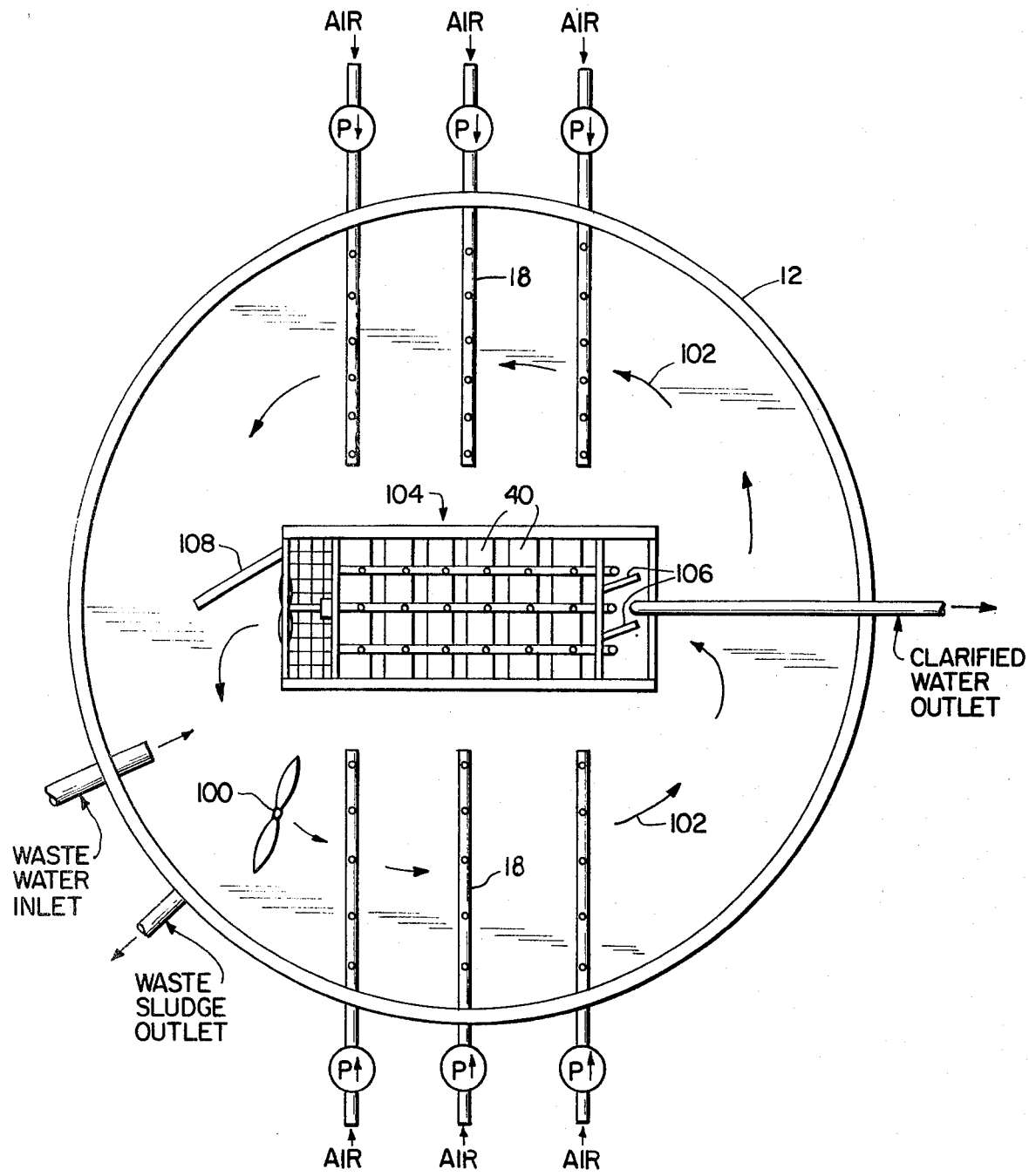
FIG. 6 is a top plan diagramatic view of the apparatus in accordance with this invention which is similar to that shown in FIG. 1 but modified with a baffle at the outlet and vanes at the inlet, the circular tank having a circulation pump to circulate the fluid in a circular flow in the tank.

FIG. 6 is similar to FIG. 1 except that only one circulation pump 100 is provided. This creates a circular movement of the waste water as indicated by directional arrows 102. The clarifier system 104 is provided with influent guides or straightening vanes 106 which are located at the entrance to the flow path under the baffle surfaces 40. The purpose of the vanes 106 is to straighten the flow of the waste water from the curved flow path as it enters the clarifier system. The clarifier system 104 is also provided with a baffle 108 which is locaed at the exit end of the flow path. The purpose of the baffle 108 is to direct the waste water flowing under the baffle surfaces 40 through the exit to the flow path into the direction of the basin flow.

Figure 7:
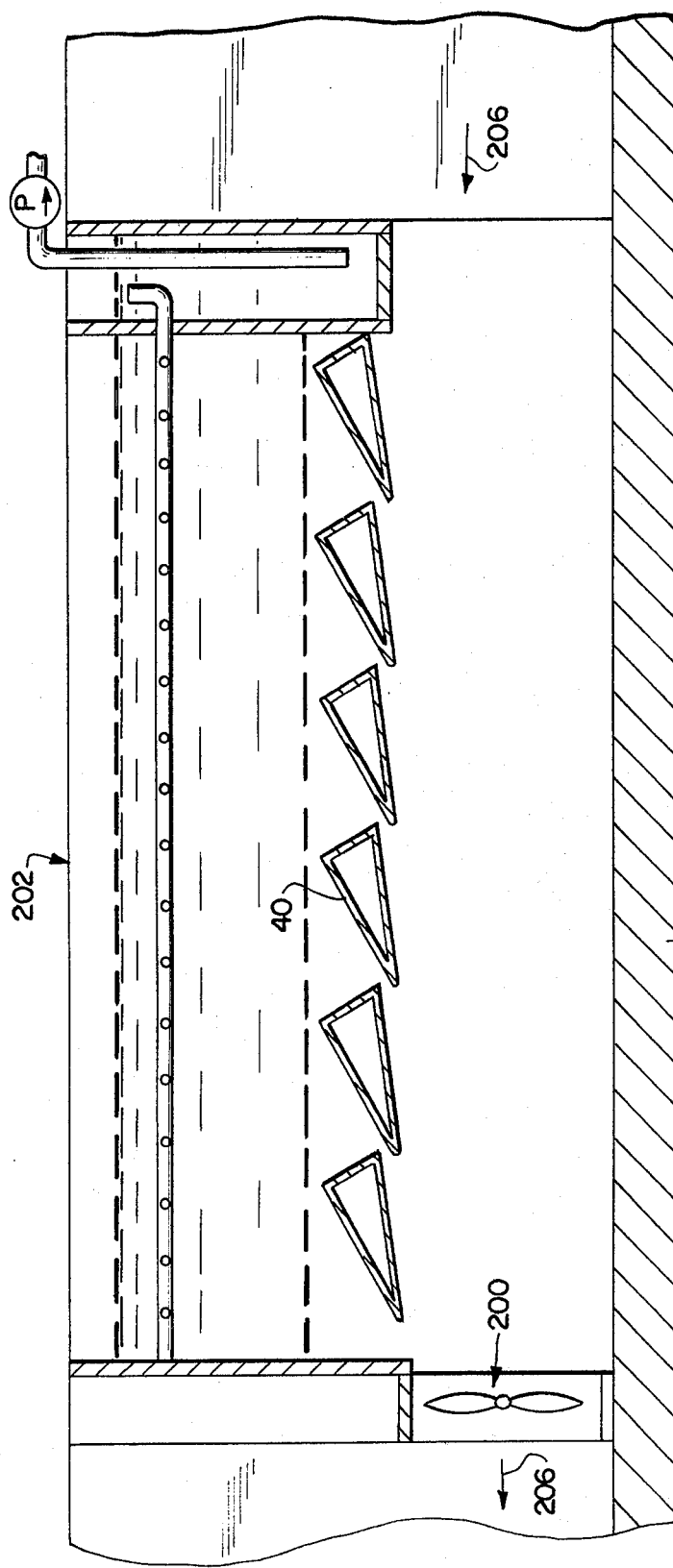
FIG. 7 is a side elevational view in longitudinal section of a modified apparatus having the impeller pump located adjacent to the bottom of the flow path and having the tank bottom wall forming the bottom of the flow path.

FIG. 7 is similar to FIG. 2 except that it shows pump 200 located adjacent the bottom of the clarifier system 202. In this embodiment, the tank bottom wall 204 also serves as the bottom of the clarifier system. Waste water is drawn underneath the baffle surfaces 40 as indicated by directional arrows 206.

What is claimed is:

1. An apparatus for clarifying fluids in a fluid container, the combination comprising:
    first means, for defining a quiescent zone in the container, said first means including a pair of end walls, a pair of side walls, a bottom wall comprising at least one surface having open and closed areas to permit settled solids to pass out of said quiescent zone and means to introduce fluid containing suspended solids into said quiescent zone;
    second means, located below said first means, for defining a fluid flow path below and in communication with said bottom wall,
    said second means having an opening at each end to form an inlet and an outlet,
    said second means being bounded on the top by the bottom wall of said first means and closed on the bottom and sides thereof,
    pump means, located substantially adjacent to said outlet of said second means, for creating a low pressure area at said outlet, thereby causing the fluid to flow into said inlet, along said flow path, at least a portion thereof out of said outlet, and causing settled solids to pass through said open areas from said quiescent zone into said flow path, and
    third means, located in said first means, for removing clarified fluid from the top of said first means and from the fluid container.

2. An apparatus as defined in claim 1 wherein fluid from the flow path passes into said quiescent zone through said open areas.

3. An apparatus as defined in claim 2 wherein the bottom wall of said first means further comprises a plurality of spaced, horizontal members extending subtantially perpendicular to the flow path, the cross section of each of said members comprising a triangle, with the apex of the triangle facing the quiescent zone so as to provide no horizontal surfaces on the bottom facing said quiescent zone.

4. An apparatus as defined in claim 1 wherein said pump means is situated in the opening at said outlet.

5. An apparatus as defined in claim 4 wherein the bottom wall of said first means further comprises a plurality of spaced, horizontal members extending substantially perpendicular to the flow path, the cross section of each of said members comprising a triangle, with the apex of the triangle facing the quiescent zone so as to provide no horizontal surfaces on the bottom facing said quiescent zone.

6. An apparatus as defined in claim 1 wherein said pump means is situated above the opening in said outlet adjacent the end wall of said first means.

7. An apparatus as defined in claim 6 wherein the bottom wall of said first means further comprises a plurality of spaced, horizontal members extending substantially perpendicular to the flow path, the cross section of each of said members comprising a triangle, with the apex of the triangle facing the quiescent zone so as to provide no horizontal surfaces on the bottom facing said quiescent zone.

8. An apparatus as defined in claim 1 wherein said bottom wall comprises spaced, sloping surfaces extending across the bottom of the quiescent zone.

9. An apparatus as defined in claim 8 wherein the bottom wall of said first means further comprises a plurality of spaced, horizontal members extending substantially perpendicular to the flow path, the cross section of each of said members comprising a triangle, with the apex of the triangle facing the quiescent zone so as to provide no horizontal surfaces on the bottom facing said quiescent zone.

10. An apparatus as defined in claim 1 wherein the bottom wall of said first means further comprises a plurality of spaced, horizontal members extending substantially perpendicular to the flow path, the cross section of each of said members comprising a triangle, with the apex of the triangle facing the quiescent zone so as to provide no horizontal surfaces on the bottom facing said quiescent zone.

11. An apparatus as defined in claim 1 wherein the bottom wall of said first means further comprises a plurality of spaced, horizontal members extending substantially perpendicular to the flow path, the cross section of each of said members comprising a triangle, with the apex of the triangle facing the quiescent zone so as to provide no horizontal surfaces on the bottom facing said quiescent zone.

12. An apparatus as defined in claim 1 wherein the inlet of said second means is provided with straightening vanes to straighten the flow of said fluid from a curved flow path.

13. An apparatus as defined in claim 12 wherein the outlet of said second means is provided with a baffle to direct induced underflow into the direction of the basin flow.

14. A process for clarifying fluids which comprises establishing a quiescent zone in a body of fluid, said zone being closed from the surrounding fluid on the ends and sides thereof, the bottom of said zone comprising at least one surface having open and closed areas to permit solids to pass out of said quiescent zone, providing means to introduce fluid containing suspended solids into said quiescent zone, said quiescent zone containing fluid, permitting solids to settle from said fluid in said quiescent zone, removing clarified fluid from the top of said quiescent zone, providing a flow path in the fluid outside of said quiescent zone along said bottom by a pump means located at the end of said zone and downstream of said flow path, said flow path being provided in a flow path zone which is bounded on the top by the bottom of said quiescent zone, closed on the bottom and sides thereof and open at each end, whereby settled solids pass through said open areas from said quiescent zone into said flow path.

15. A process as defined in claim 14 wherein fluid from the flow path passes into said quiescent zone through said open areas.

16. A process as defined in claim 15 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

17. A process as defined in claim 14 wherein said pump means is situated in the opening at the end of said flow path zone.

18. A process as defined in claim 17 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

19. A process as defined in claim 14 wherein said pump means is situated above the opening at the end of said flow path zone adjacent the end of said quiescent zone.

20. A process as defined in claim 19 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

21. A process as defined in claim 14 wherein said bottom wall comprises spaced sloping surfaces extending across the bottom of said quiescent zone.

22. A process as defined in claim 21 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

23. A process as defined in claim 14 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

24. A process as defined in claim 14 wherein the bottom of said quiescent zone further comprises a plurality of spaced, horizontal members extending substantially perpendicular to the flow path, the cross section of said members comprising a triangle, with the apex of the triangle facing the quiescent zone so as to provide no horizontal surfaces facing the bottom of said quiescent zone.

25. A process as defined in claim 14 wherein said fluid is waste water.

* * * * *